June 7, 1960 W. B. GREEN 2,939,293
START-UP PROCEDURE – GAS FRACTIONATOR
Filed April 7, 1958 2 Sheets-Sheet 1

INVENTOR.
W. B. GREEN
BY *Hudson & Young*

ATTORNEYS

000000000000000000000000000000000000000000000000

United States Patent Office

2,939,293
Patented June 7, 1960

2,939,293

START-UP PROCEDURE—GAS FRACTIONATOR

William B. Green, Pasadena, Tex., assignor to Phillips Petroleum Company, a corporation of Delaware Filed Apr. 7, 1958, Ser. No. 726,776

8 Claims. (Cl. 62—19)

This invention relates to gas separation. In one of its aspects, this invention relates to a method of operation during start-up of fractionator wherein normally gaseous materials are separated by fractionation.

In the separation of normally gaseous materials it is frequently the practice to liquefy the gase and pass same to a fractionation column. The usual practice is to pass the feed to the fractionation column intermediate its top and bottom, to condense the overhead and pass a portion of the condensed material back to the top of the column as reflux, to withdraw kettle product, cool this kettle product by expansion and utilize the cool fluid to chill the feed in indirect heat exchange between said cool fluid and the feed. However, when such a system is first put on stream, there is no kettle product to be utilized as source for chilling the feed. Under these conditions, the feed passing into the column is gas or is vaporized on entering the column and the resulting rapid flow of gas tends to entrain the reflux and carry it out of the column. By the present practice, the operator must carefully control the rate of feed and reflux and in many cases after as much as 24 hours or even longer, the operator finds he is back where he started due to some upset in the system. I have now found that such a system is readily put on line by the practice of this invention.

It is an object of this invention to provide a start-up procedure for fractionation of normally gaseous materials.

It is another object of this invention to provide a method of putting a fractionator, wherein normally gaseous materials are being separated, on stream.

Still other objects, features and advantages of this invention will be obvious to those skilled in the art.

According to this invention the reflux from a fractionator wherein liquefied gases are being separated is added to the fractionation zone at a position no higher than the feed position until sufficient kettle product is being produced to cool the feed gas and then introducing the reflux to the top of the column.

This invention is applicable for fractionation of any liquefied gas mixture. While the invention is usually applied to a simple two component system, it is equally applicable to separating systems containing more than two components into two fractions, each fraction being treated as a single component. These separate fractions can then be further separated if desired. Typical separations include carbon monoxide from ethylene, oxygen from nitrogen, hydrogen from methane, hydrogen from ethylene, methane from ethylene, methane from acetylene, helium from natural gas (methane plus hydrogen) and similar separations.

The fractionation column can be of any conventional design and the method is applicable to both packed columns and tray columns.

I have found the invention particularly applicable to the separation of ethylene from carbon monoxide. It is known in the art to prepare ethylene by dehydrogenation of paraffins in the persence of steam, e.g., cracking of butane in presence of steam. The resulting effluent will contain uncracked stock, ethylene, carbon dioxide and carbon monoxide. The butane is readily removed by condensation and the $CO_2$ by absorption. The resulting ethylene-carbon monoxide is not so readily separated and the separation of such material by liquefaction and fractionation is resorted to. Ethylene is a valuable material in chemical synthesis and particularly for preparation of polymers which can be formed into useful articles by casting, molding, extrusion and the like. For such use, high purity ethylene is often required or at least is desirable.

This invention will be further described in conjunction with the attached drawings of which:

Figure 1:
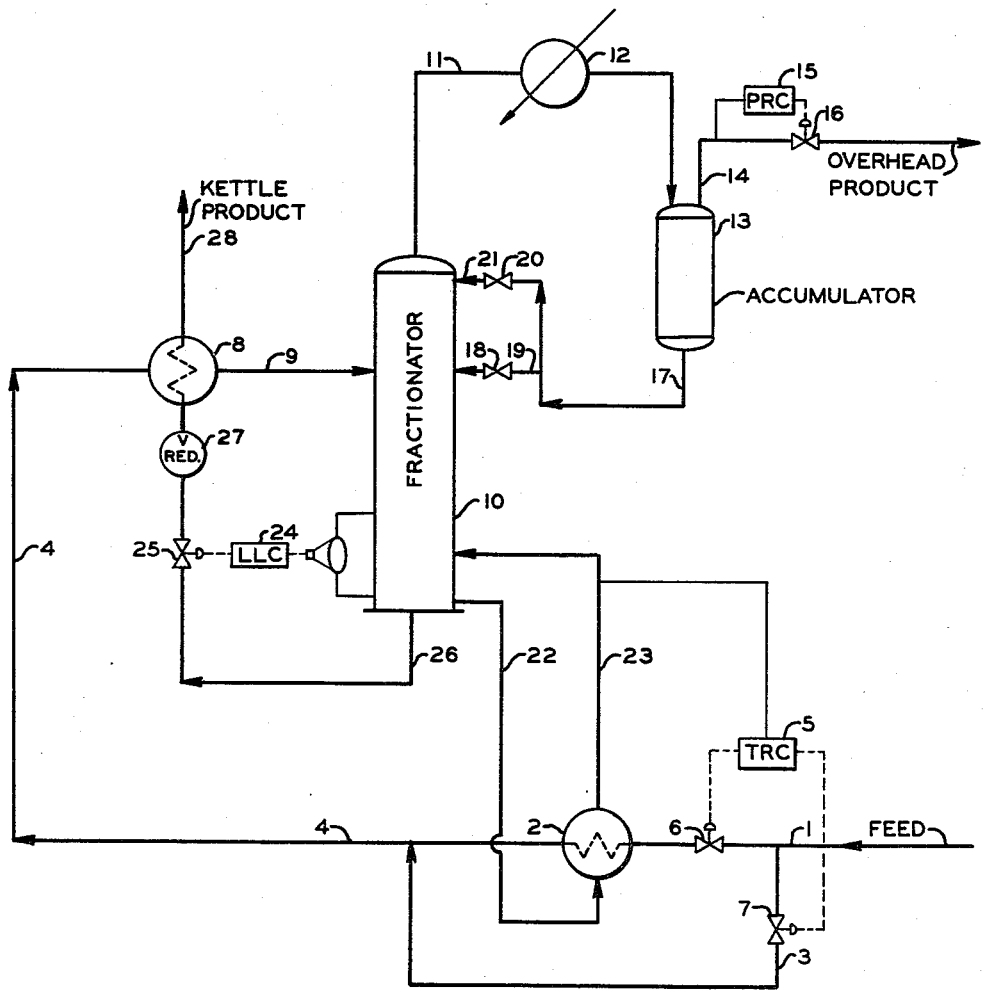
Figure 1 is a flow diagram showing a typical gas fractionation utilizing the flow of this invention.

Referring now to the drawing, a feed stream comprising two normally gaseous components passes via conduit 1 to heat exchanger 2 where it is precooled as later described. A portion of the stream can by-pass this cooler via conduit 3 or alternatively the stream can be split sending a portion through heat exchanger 2 and a portion through heat exchanger 8, described below, recombined and passed to column 10, described below. The two streams are recombined in conduit 4. The amount of gas passing through heat exchanger 2 will be dependent upon the heat requirement of the fractionator, later described. The amount of gas passing through the heat exchanger 2 can be manually controlled or the stream can be proportioned automatically by temperature recorder controller 5 which controls valves 6 and 7 in conduits 1 and 3 respectively. Alternatively, all of the feed stream can pass through heat exchanger 2 with the amount of kettle product, as will be described, being varied. In any case, the stream in conduit 4 passes via heat exchanger 8 and conduit 9 to a selected feed level in fractionator 10. At the start-up, there is no cooling media for heat exchanger 2 and 8, therefore the feed passes overhead via conduit 11 to condenser 12 and accumulator 13. The uncondensed portion passes overhead from accumulator 13 via conduit 14 and valve 16. This valve 16 is controlled via pressure controller 15 which is set to hold a predetermined pressure on accumulator 13. The condensed material is returned to fractionator 10 at a level no higher than the feed level via conduit 19 and valve 18. Valve 20 is closed during this start-up period preventing liquid from flowing via conduit 21. As this liquid from conduit 19 enters fractionator 10 it gravitates and begins to evaporate and cools the fractionator. As the fractionator cools, liquid will accumulate in the lower part of fractionator 10 and will begin to circulate via conduits 22 and 23 through heat exchanger 2. In the embodiment shown, all of the feed will by-pass the heat exchanger 2 during this start-up period. When the temperature in conduit 23 is lowered to the desired level, temperature recorder controller 5 will control valves 6 and 7 to admit feed through heat exchanger 2. The feed is partially cooled in this exchanger and the kettle product temperature is controlled. In the meantime, the fractionator 10 kettle is filled and liquid level controller 24 opens valve 25 allowing liquid to flow to pressure reducing valve 27 wherein the liquid evaporates and is expanded through heat exchanger 8 condensing feed. The kettle product is then passed via conduit 28 to product storage or further processing as desired. At this time, the feed is cooled sufficiently that the reflux from conduit 17 can be admitted to the top of the fractionator 10. At this time valve 18 is closed and valve 20 is opened and and the fractionator is in service. The reflux entering via conduit 21 absorbs the higher boiling components of the vapor passing upward through the column and is in turn stripped of the lower boiling components. A low boiling rich stream now passes via conduit 11 and condenser 12 to accumulator 13. The lower boiling, non-condensed product is removed via conduit 14 and the higher boiling, condensed material is returned as reflux via conduits 17 and 21 to fractionator 10. A higher boiling rich stream gravitates to the kettle of fractionator 10 and any low boiling material is distilled off by controlling the temperature of the kettle by passing kettle product via conduit 21 to heat exchanger 2 and returning the product to the kettle via conduit 23.

Figure 2:
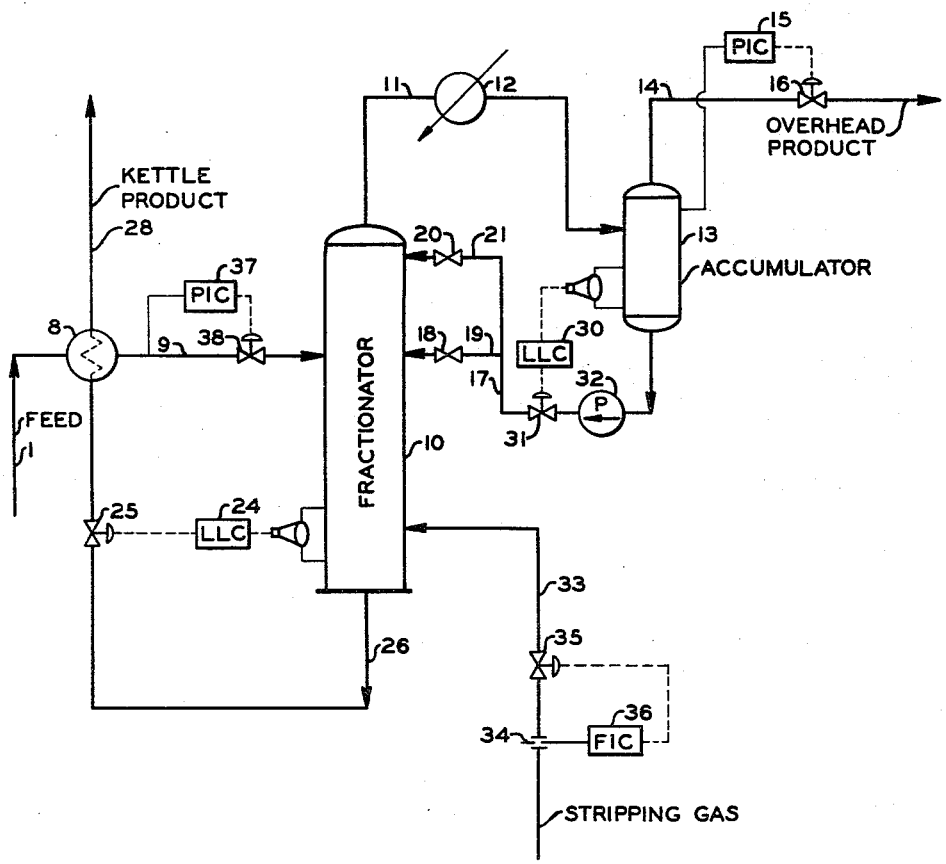
Figure 2 is a modification wherein a stripping gas is employed.

In Figure 2, equivalent pieces of apparatus carry the same reference numeral as does Figure 1. In this figure, the accumulator 13 is shown equipped with level controller 30 operably connected to valve 31 in conduit 17. Also pump 32 is shown in conduit 17. This pump should be of the constant head type. Conduit 9 has valve 38 and pressure indicator controller 37 operably installed therein to maintain a constant head on the feed. It should be understood that such equipment can also be used in conjunction with Figure 1 if desired. In the embodiment of Figure 2, a stripping gas from conduit 33 is utilized in the fractionation zone 10. A flow indicator controller 36 is operably attached to orifice 34 in conduit 33 and this controller controls the stripping gas via valve 35 in conduit 33.

Specific embodiment

An embodiment of this invention will be described in conjunction with Figure 2. Rates are given in mols per hour based on 100 mols per hour of feed. Under normal operating conditions a feed stream comprising 1 mol methane, 98.995 mols ethylene and 0.005 mol carbon monoxide at 410 p.s.i. and 130° F. is passed via conduit 4 to cooler 8 where the gas is liquefied to substantially 100 percent liquid and the temperature lowered to 3° F. Note: ethylene figure includes ethane and acetylene with each of these components averaging about 0.3 mol percent in both the feed and kettle product. This condensed gas (liquid) is partially expanded via valve 38 giving about 90 percent liquid and −15° F. at 310 p.s.i.g. This latter material, 90 percent liquid −10 percent gas, is fed to fractionator 10 which has a top temperature of −15° F. and a bottom temperature of −14° F. and a pressure of 310 p.s.i.g. A stripping gas comprising 0.085 mol methane, 9.815 mols ethylene and 0.0001 mol carbon monoxide passes to a low level in fractionation zone 10 via conduit 33. Kettle product, approximately 100 percent liquid and comprising 0.935 mol methane, 107.964 mols ethylene and 0.0011 mol carbon monoxide is expanded via valve 25 to 250 p.s.i.g., −30° F. and to about 90 percent liquid. This material during passing heat exchanger 8 is heated to 100° F. The overhead from column 10 passes via conduit 11 to condenser 12 wherein a fluid at −40° F. is passed through the cooling coils. The overhead is cooled to −25° F. and passed to accumulator 13. A portion of liquid is recycled via conduit 21 to the column as reflux and this cold liquid helps maintain the column at the desired temperature. The effluent from accumulator 13 comprising 0.150 mol methane, 0.846 mol ethylene and 0.004 mol carbon monoxide is passed via conduit 14 to further processing as desired.

During the start-up of such a system, as is shown in Figure 2, valves 25 and 16 are adjusted to hold 300 p.s.i.g. on the column and accumulator. Valve 18 is opened and valve 20 is closed. The feed is started to the column, however, since there is no kettle product, the feed is cooled only by expansion and enters the column substantially in the gaseous state. This gas passes overhead via conduit 11 to cooler 12 wherein a portion of the gas is liquefied. After a short period of operation, the accumulator is cooled down sufficiently for liquid to accumulate. This liquid is then pumped via pump 32, conduit 17, valve 18 and conduit 19 to the fractionator as reflux. Conduit 19 enters the fractionator at a position no higher than feed and therefore is free to gravitate in the fractionator. The liquid is evaporated thereby cooling the fractionator until liquid begins to accumulate in the kettle. When the desired liquid level is obtained, the valve 25 is opened and liquid flows via conduit 26 and valve 25 to cooler 8. At this time, the feed is cooled as in normal operation and begins to enter the column at about 90 percent liquid. When this point is reached, valve 18 is closed and valve 20 is opened so that the reflux flows countercurrently to the gases from the feed in the upper part of the column. The flow of stripping gas is then started and the unit is on stream.

I claim:

1. In the start-up of a fractionation zone wherein two normally gaseous products are being separated and wherein a portion of the overhead is returned to said fractionation zone as reflux and the kettle product is utilized to cool the feed the improvement comprising returning said reflux to said fractionation zone at a level no higher than the level of feed introduction until sufficient kettle product is being produced to provide said cooling to said feed and thereafter returning said reflux to said fractionation zone above said level of introducing feed.

2. The improvement of claim 1 wherein ethylene is being separated from carbon monoxide.

3. The improvement of claim 1 wherein oxygen is being separated from nitrogen.

4. The improvement of claim 1 wherein acetylene is being separated from hydrogen.

5. The improvement of claim 1 wherein acetylene is being separated from methane.

6. The improvement of claim 1 wherein helium is being separated from natural gas.

7. A process for separating normally gaseous components into two fractions which comprises introducing a feed stream comprising said components intermediate the top and bottom of a fractionation zone, withdrawing gaseous material comprising said components overhead from said fractionation zone, condensing a portion of said overhead gaseous material, withdrawing the uncondensed portion, returning the condensed portion to said fractionation zone at a level no higher than the level of feed introduction, gravitating at least a portion of the returned material to the bottom of said fractionation zone, withdrawing this material from the bottom of said fractionation zone and expanding same, passing the expanded material in indirect heat exchange with said feed and thereafter returning the condensed overhead material to said fractionation zone at a level above said level of feed introduction.

8. The process of claim 7 wherein a portion of the material in the bottom of said fractionation zone is withdrawn from said fractionation zone, is passed in indirect heat exchange relationship with at least a portion of said feed and is thereafter returned to said fractionation zone.

References Cited in the file of this patent

UNITED STATES PATENTS

| 2,499,043 | Voorhees | Feb. 28, 1950 |
| 2,614,971 | Burton | Oct. 21, 1952 |
| 2,729,600 | Beach | Jan. 3, 1956 |
| 2,809,925 | Nelson | Oct. 15, 1957 |